Patented June 20, 1950

2,511,870

UNITED STATES PATENT OFFICE 2,511,870

METHOD FOR PRODUCING ESTERS OF ISOPRENE HALOHYDRINS

William Oroshnik, Brooklyn, N. Y., assignor to Ortho Pharmaceutical Corporation, a corporation of New Jersey No Drawing. Application December 8, 1945, Serial No. 633,874

3 Claims. (Cl. 260—497)

This invention relates to novel compounds and to methods and steps in the methods for preparing the same. More particularly, this invention relates to various derivatives of isoprene and to methods for producing them. In one of its specific aspects, this invention is directed to the esters of the halohydrins of isoprene and especially of the 1,4 halohydrins of isoprene and the 1,2 halohydrins of isoprene. This application is continuation in part of my copending application Serial No. 617,666, filed September 20, 1945, now abandoned.

According to this invention, various derivatives of isoprene may be readily and easily produced. These various products find application in a number of different fields, and especially as reactants with other products to produce a wide variety of heretofore unknown and useful products. One class of compounds with which this invention is particularly concerned includes the esters of the 1,4 and the 1,2 halohydrins of isoprene. These compounds are particularly useful in the preparation of esters having vitamin A activity as set forth in my copending application, Serial No. 617,666, filed on September 20, 1945, and hereby made part hereof. These novel esters of the 1,2 and the 1,4 halohydrins of isoprene have the following general formula, respectively and hereinafter are respectivly referred to as Compound I and Compound II:

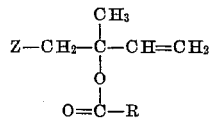

and

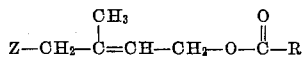

in which Z represents any halogen and R represents any hydrocarbon group and preferably any hydrocarbon alkyl, aryl, alkaryl or aralkyl group, examples of which are methyl, ethyl, butyl, hexyl, octadecyl, phenyl, naphthyl, para ethyl phenyl, cresyl, tertiary butyl phenyl, benzyl, phenyl, ethyl, phenyl propyl etc. groups.

A general method for preparing said esters is as follows: A quantity of isoprene is dissolved in a large excess of an organic carboxylic acid. Said acid is preferably monocarboxylic and has the following formula R—COOH, in which R is hydrogen or a hydrocarbon radical and preferably an alkyl radical, such as methyl, ethyl, propyl, butyl, isopropyl, stearyl, etc., an aryl radical, such as phenyl, tolyl etc., or an arylalkyl radicle in which an aryl group is substituted for a hydrogen atom of an alkyl. Examples of some of said acids are formic, acetic, propionic, butyric, isobutyric, stearic, benzoic, phenyl acetic, phenyl propionic, naphthylacetic etc. The organic acid employed depends upon the hydrocarbon radicle which is to be coupled with the isoprene through a COO group for example, acetic acid is employed when R is to be methyl, benzoic acid is employed when R is to be phenyl, etc. To said solution of isoprene and said monocarboxyl hydrocarbon is added a quantity of an agent capable of yielding a hypohalous acid under these conditions. An example of a class of one of said agents are the alkyl esters of hypochlorous acid such as tertiary butyl hypochlorite. The mixture is allowed to react. After reaction, the products are isolated and separated from each other by distillation. By employing this process at least two useful fractions are obtained, namely Compound I and Compound II which are separated from each other. Compound I may be converted to Compound II if desired by dissolving Compound I in the organic acid employed in its reaction with isoprene to produce the same and containing a catalytic quantity of a strong acidic agent, such as sulphuric acid, paratoluene sulphonic acid, stannic chloride, etc. and a trace of a copper salt, such as anhydrous copper sulphate. When these are brought together under these conditions, the reaction proceeds spontaneously at room temperature to cause an allylic rearrangement of Compound I whereby the same is converted to Compound II.

For the purposes of illustration, I shall hereinafter set forth Examples 1 to 3 in order to show the methods for preparing illustrative examples of some of the novel esters. These examples are set forth by way of illustration and not limitation.

*Example 1*

120 grams of isoprene are dissolved in 500 cc. of glacial acetic acid. The solution is cooled to 10° C. to 15° C. by any convenient means. This solution is maintained at said temperature and is constantly stirred over a two-hour period, during which time are added in equal small increments a total of 180 grams of tertiary butyl hypochlorite. After the complete addition of said hypochlorite, the mass is stirred for an additional half hour at room temperature and is then poured into a large volume of water, whereupon oil separates out. Then there is added thereto a quantity of ethyl ether sufficient to take up the oil constituent of said mass while the entire mass is being thoroughly agitated in order to extract as much of said oily mass as possible. Then the mass is allowed to settle, whereupon it separates into two main layers, an aqueous layer and an ether layer.

The aqueous layer is separated and discarded from the ether solution. The remaining ether solution is washed several times with water and finally with an aqueous solution of sodium bicarbonate. The ether solution is then dried with anhydrous potassium carbonate. The drying agent is filtered off and the filtrate is recovered. The filtrate may then be concentrated by distilling off the ether. This concentrate is then fractionally distilled under a vacuum of about 10 mm. of mercury pressure. The following fractions are recovered and separated from each other.

Fraction I measures about 50 grams, has a boiling point of 60° C. to 61° C. at 10 mm. of mercury pressure, has an index of refraction at 23° C. of 1.4445 and is 1-chloro-2-methyl-2-acetoxybutene-3 and has the following formula:

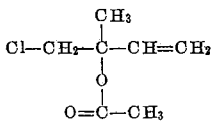

Fraction II measures 85 grams, has a boiling point of 91° C.–93° C. at 10 mm. of mercury pressure, an index of refraction at 23° C. of 1.4642 and is 1-chloro-2-methyl-4-acetoxybutene-2, and has the following formula:

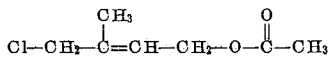

*Example 2*

Into a liter, three-necked flask is placed 500 ccs. of anhydrous acetone. Then there is added thereto 150 grams calcium bromide and these components are mixed together. Then 50.9 grams of 1-chloro-2-methyl-4-acetoxybutene-2, is slowly added to said mixture. During this addition, some heat was evolved and the bromide became caked. The mixture is brought to a boil and maintained in this state of boiling for a period of about one-half hour in order to disperse the cake. Then the mixture is mechanically stirred for a period of about twenty-four hours at room temperature. After this stirring operation, this mixture is poured into a large volume of water, whereupon an oily mass separates out. To this mixture is added ethyl ether. The resultant mixture is vigorously agitated in order to extract as much as possible of the oily mass from the aqueous portion thereof. This mass is now allowed to settle into two main layers, an ether layer and an aqueous layer. The aqueous layer may then be separated from the ether layer and is discarded. The remaining ether solution is washed several times with water and finally with sodium bicarbonate solution. The washed ether solution is then dried with anhydrous potassium carbonate. The drying agent is filtered off and the filtrate is distilled, whereupon the bulk of the ether solvent is removed. The remaining liquid may be fractionally distilled under a vacuum of about 12 mm. of mercury pressure. On vacuum distillation, there was obtained 35 grams of a mixture of chloro and bromo compound and 4 grams of a liquid boiling at 108° C. at 12 mm. of mercury pressure, having an index of refraction at 24.3° C. of 1.4906 and being 1-bromo-2-methyl-4-acetoxybutene-2 and having the following formula:

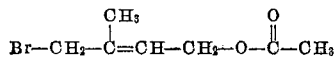

*Example 3*

Into a 500 ccs. 3-necked flask is placed 250 cc. of anhydrous acetone. Then to said acetone is added 150 grams of sodium iodide, which previously had been baked at 155° C. for two hours and then ground. This mixture is stirred and there is added thereto 57 grams of 1-chloro-2-methyl-4-acetoxybutene-2. This chloro compound is added rather slowly and in the course of addition the temperature of the mass increases to about 35° C. This mixture is then mechanically stirred at room temperature for 18 hours. After this stirring operation, this mixture is poured into a large volume of water, whereupon an oily mass separates out. To this mixture is added ethyl ether, the resultant mixture is vigorously agitated in order to extract as much as possible of the oily mass from the aqueous portion thereof. This mass is now allowed to settle into two main layers, an ether layer and an aqueous layer. The aqueous layer may then be separated from the ether layer and is discarded. The remaining ether solution is washed several times with water and finally with sodium bicarbonate solution. The washed ether solution is then dried wtih anhydrous potassium carbonate. The drying agent is filtered off and the filtrate is distilled, whereupon the bulk of the ether solvent is removed. The remaining liquid was distilled under a vacuum of about 0.4 mm. of mercury pressure, whereupon there was obtained 83 grams of a liquid boiling at 72° C. at 0.4 mm. of mercury pressure and being 1-iodo-2-methyl-4-acetoxybutene-2 having the following general formula:

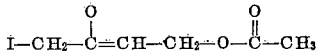

Various novel compounds may be produced with these esters by (a) reacting them with an acetylide such as sodium, potassium, lithium or calcium acetylide; (b) reacting them with a Grignard reagent, such as an alkyl metal halide; (c) for the syntheses of compounds containing two or more isoprene units in their carbon skeletons for the synthesis of amines which may be used in the production of quaternary ammonium compounds; reacting them with sodium salts of malonic or acetoacetic esters and finally hydrolyzing.

Since certain changes in carrying out the above process and certain modifications in the compositions which embody the invention may be made without departing from its scope, it is intended that all matter contained in the description shall be interpreted as illustrative and not in a limiting sense.

I claim:

1. A method comprising reacting a mixture of isoprene, an organic acid represented by the formula

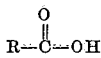

in which R is a lower alkyl radical, and a lower alkyl hypohalite to provide compounds having the following formula

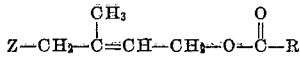

in which Z is halogen and R is a lower alkyl radical.

2. The method comprising reacting a mixture of isoprene, acetic acid and tertiary butyl hypochlorite.

3. A method comprising reacting a mixture of isoprene, a lower aliphatic monocarboxylic acid, and tertiary butyl hypochlorite.

WILLIAM OROSHNIK.

REFERENCES CITED

The following references are of record in the file of this patent:

UNITED STATES PATENTS

| Number | Name | Date |
|---|---|---|
| 1,790,521 | Davis et al. | Jan. 27, 1931 |
| 2,107,789 | Harford | Feb. 8, 1938 |
| 2,164,188 | Groll et al. | June 27, 1939 |
| 2,314,454 | Manchen et al. | Mar. 23, 1943 |

OTHER REFERENCES

Garzarolli-Thurnlackh: "Annalen der Chem.," vol. 223 (1884), p. 159.

Petrov: "Jour. Gen. Chem." (U. S. S. R.), vol. 8 (1938), pp. 131–140 (in French, p. 141).

Petrov: "Jour. Gen. Chem." (U. S. S. R.), vol. 13 (1943), pp. 481–490; abst. in "Chem. Abstracts," vol. 38 (1944), p. 3248.

Certificate of Correction

Patent No. 2,511,870                                        June 20, 1950

WILLIAM OROSHNIK

It is hereby certified that error appears in the printed specification of the above numbered patent requiring correction as follows:

Column 4, lines 36 to 38, inclusive, for that portion of the formula reading

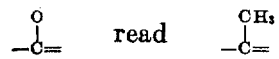

and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*